United States Patent
Kim et al.

(10) Patent No.: US 8,857,550 B2
(45) Date of Patent: Oct. 14, 2014

(54) ELECTRIC BICYCLE

(71) Applicant: Mando Corporation, Gyeonggi-do (KR)

(72) Inventors: Jeong Rae Kim, Seoul (KR); Chang Bok Ko, Namyangju-si (KR)

(73) Assignee: Mando Corporation, Gyeonggi-do (KR)

( * ) Notice: Subject to any disclaimer, the term of this patent is extended or adjusted under 35 U.S.C. 154(b) by 16 days.

(21) Appl. No.: 13/683,225

(22) Filed: Nov. 21, 2012

(65) Prior Publication Data

US 2014/0076652 A1  Mar. 20, 2014

(30) Foreign Application Priority Data

Sep. 19, 2012  (KR) .................. 10-2012-0104083

(51) Int. Cl.
  *B62M 6/45*  (2010.01)
  *B62K 15/00*  (2006.01)
  *B62K 25/00*  (2006.01)
  *B62K 11/00*  (2006.01)
  *B62M 6/40*  (2010.01)
  *B62K 3/10*  (2006.01)

(52) U.S. Cl.
  CPC .............. *B62K 11/00* (2013.01); *B62K 15/006* (2013.01); *B62K 25/005* (2013.01); *B62M 6/40* (2013.01); *B62K 3/10* (2013.01)
  USPC ..................................................... 180/206.2

(58) Field of Classification Search
  CPC ............. B62M 6/45; B62M 6/40; B62M 6/65
  USPC .............. 180/220, 206.1, 206.2, 206.5, 206.6
  See application file for complete search history.

(56) References Cited

U.S. PATENT DOCUMENTS

| 3,884,317 | A | * | 5/1975 | Kinzel | 180/220 |
| 5,226,501 | A | * | 7/1993 | Takata | 180/206.2 |
| 5,777,442 | A | * | 7/1998 | Miyata | 318/2 |
| 2004/0084238 | A1 | * | 5/2004 | Yokotani et al. | 180/205 |
| 2007/0187952 | A1 | * | 8/2007 | Perlo et al. | 290/1 R |
| 2009/0095552 | A1 | * | 4/2009 | Gulas | 180/207 |
| 2011/0266082 | A1 | * | 11/2011 | Yang | 180/206.5 |

(Continued)

FOREIGN PATENT DOCUMENTS

| DE | 19732430 A1 | 2/1999 |
| EP | 0778654 A2 | 6/1997 |
| JP | 08-207874 A | 8/1996 |
| KR | 10-2012-0001834 A | 1/2012 |
| KR | 10-2012-0027917 A | 3/2012 |
| WO | 2011/081359 A2 | 7/2011 |

OTHER PUBLICATIONS

Korean Office Action issued in Korean Application No. 10-2012-0104083 dated Nov. 27, 2013.

(Continued)

*Primary Examiner* — Kevin Hurley
(74) *Attorney, Agent, or Firm* — McDermott Will & Emery LLP

(57) ABSTRACT

An electric bicycle having an enhanced fixing structure of an electronic control unit, the electrical bicycle having an electronic control unit built in an a center frame along with a generator in a state of the electronic control unit is directly fixed at an upper portion of the generator, the electronic control unit is effectively be protected, as the fixing structure of the electronic control unit is simplified.

7 Claims, 8 Drawing Sheets

(56) References Cited

U.S. PATENT DOCUMENTS

2012/0061161 A1* 3/2012 Jang .............................. 180/220
2012/0202649 A1* 8/2012 Huber .............................. 482/2
2012/0273287 A1* 11/2012 Song ........................ 180/65.31
2013/0093187 A1* 4/2013 Lim ................................ 290/50

OTHER PUBLICATIONS

Extended European Search Report issued in European Application No. 12190251.4 dated Dec. 20, 2013, 8 pgs.

* cited by examiner

ELECTRIC BICYCLE

CROSS-REFERENCE TO RELATED APPLICATION

This application claims the benefit of Korean Patent Application No. 2012-0104083, filed on Sep. 19, 2012, in the Korean Intellectual Property Office, the disclosure of which is incorporated herein by reference.

BACKGROUND

1. Field

Embodiments of the present disclosure relate to an electric bicycle, and more particularly, to an electric bicycle having an enhanced installation structure of an electronic control unit (ECU).

2. Description of the Related Art

Recently, an electric bicycle configured to run while having a motor as a driving force source to reduce the loss of physical strength of a user while increasing the convenience in usage is being developed.

The electric bicycle is provided with a frame and a wheel, a pedal and a handle installed on the frame, providing an external appearance similar to a general bicycle.

A motor configured to provide driving force is installed at a front wheel or at a rear wheel. The motor is normally configured to be supplied with power through a battery, and the overall motion of an electric bicycle that is related to the motor and the driving of the motor is controlled through an electronic control unit (ECU).

Meanwhile, in a case of the electronic control unit (ECU), the circuit board built in at the electronic control unit (ECU) may be easily damaged, and thus, recently, the attention is drawn to the effort in having the electronic control unit (ECU) installed in a way to be built in at a frame so that the frame is made to be used as a protective structure of the electronic control unit (ECU), and at the same time, in preventing the exterior appearance of the electric bicycle being hindered by the electronic control unit (ECU).

However, at this time, as to prevent the movement of the electronic control unit (ECU) built in at the frame, a separate fixing bracket is needed to be installed at a small space of an inside the frame, the installation structure of the electronic control unit (ECU) at an inside the frame is complicated.

SUMMARY

Therefore, it is an aspect of the present disclosure to provide an electric bicycle configured to effectively protect the electronic control unit (ECU) that is built in at a frame of the electric bicycle, and at the same time, provided therein with a simplified installation structure of the electronic control unit (ECU).

Additional aspects of the disclosure will be set forth in part in the description which follows and, in part, will be obvious from the description, or may be learned by practice of the disclosure.

In accordance with one aspect of the present disclosure, an electric bicycle includes a motor, a battery, a generator, and an electronic control unit (ECU). The motor may be configured to rotate a front wheel or a rear wheel. The battery may be configured to supply power to the motor. The generator, while installed in a way that pedals are connected at a frame in between the front wheel and the rear wheel, may be configured to convert a rotational force of the pedals into electric energy, and to supply the electric energy to the battery. The electronic control unit (ECU) may be built in at the frame in a state of directly fixed to an upper portion of the generator.

The frame may further include a front frame, a rear frame and a center frame. The front frame may be provided with the front wheel. The rear frame may be provided with the rear wheel. The center frame may be formed in a shape of a hollowness while one end of the center frame is connected to in between the front frame and the rear frame and the other end of the center frame is provided at an inside thereof with the generator installed. The electronic control unit (ECU) may be configured in a way to be built in between both ends of the center frame.

At the upper portion of the generator, a mounting unit to fix the electronic control unit (ECU) may be provided while being protruded toward an upper portion. An inner wall of the center frame that corresponds to a position of the mounting unit may be configured in a way to be closely adhered to an outer surface of the mounting unit to prevent the mounting unit from moving.

At the upper portion of the generator, a mounting unit to fix the electronic control unit (ECU) may be provided while being protruded toward an upper portion. The electronic control unit (ECU) may include a circuit board and a housing having the circuit board built in. The circuit board may be mounted at an inner surface of a side panel of one side of the housing. The housing may be fixed to the mounting unit through a bottom panel. The side panel and the bottom panel may be provided with the same heat-discharging material.

A rear end of the front frame and a front end of the rear frame may be rotatively coupled to both sides of an upper end of the center frame such that the front frame and the rear frame are folded toward the lateral sides of the center frame.

In accordance with another aspect of the present disclosure, an electric bicycle includes a motor, a battery, a generator, and a mounting unit. The motor may be configured to rotate a front wheel or a rear wheel. The battery may be configured to supply power to the motor. The generator may include a generator unit and a cover, and provided in between the front wheel and the rear wheel. The generator unit may be installed in a way to be connected to pedals, and configured to supply electric energy to the battery by converting a rotational force into the electric energy. The cover may be configured to surround the generator unit. The mounting unit may be integrally formed with an upper portion of the cover so that the electronic control unit (ECU) is directly fixed to an upper portion of the generator.

An electric bicycle in accordance with an embodiment of the present disclosure is provided with an electronic control unit (ECU) built in at a frame, while the electronic control unit (ECU) is directly connected to an upper portion of a generator that is disposed in between the front wheel and the rear wheel.

Thus, the electric bicycle as such, without using a separate fixing structure, is capable of fixing the electronic control unit (ECU) at an inside the frame in a stable manner, and thus the electronic control unit may be effectively protected while the installation structure of the electronic control unit is simplified.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
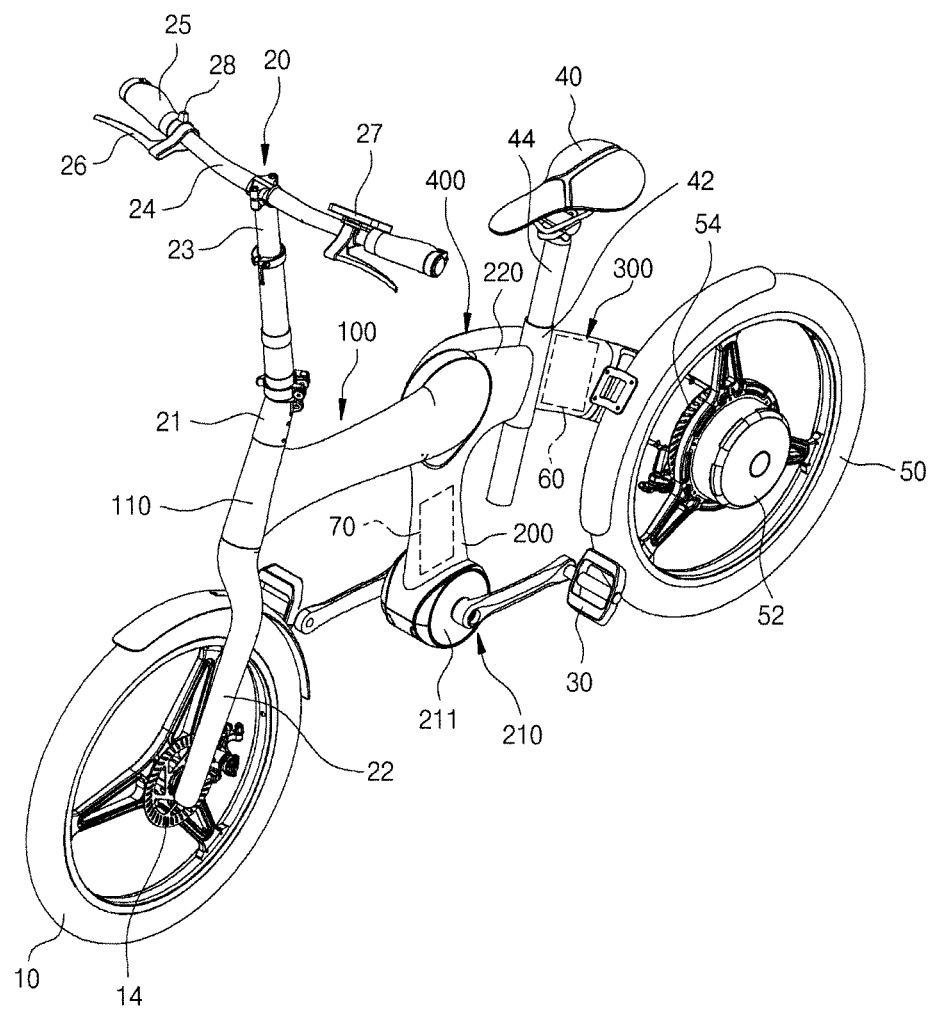
FIG. 1 is a perspective view of an electric bicycle in accordance with an embodiment of the present disclosure.

Reference will now be made in detail to the embodiments of the present disclosure, examples of which are illustrated in the accompanying drawings, wherein like reference numerals refer to like elements throughout.

Figure 2:
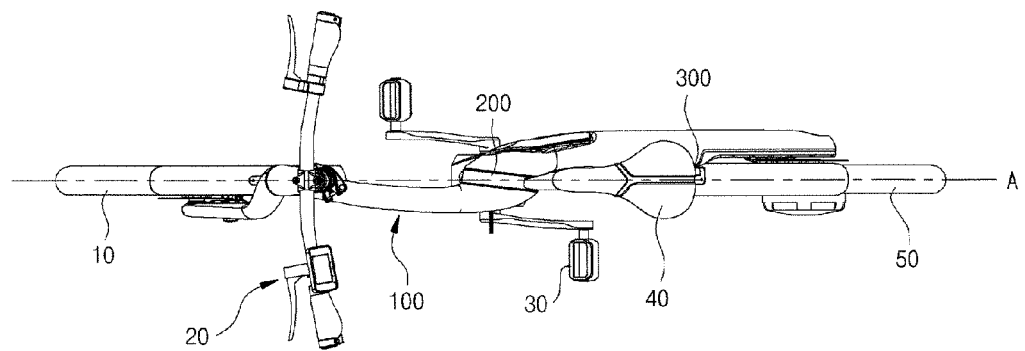
FIG. 2 is a plane view of an electric bicycle in accordance with an embodiment of the present disclosure.
Figure 3:
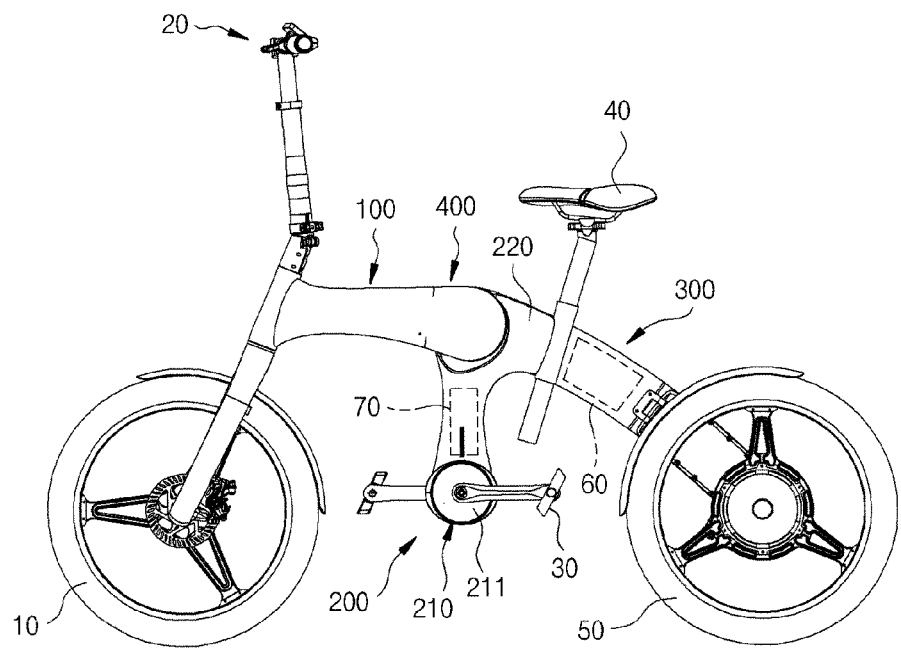
FIG. 3 is a side view of an electric bicycle in accordance with an embodiment of the present disclosure.
Figure 4:
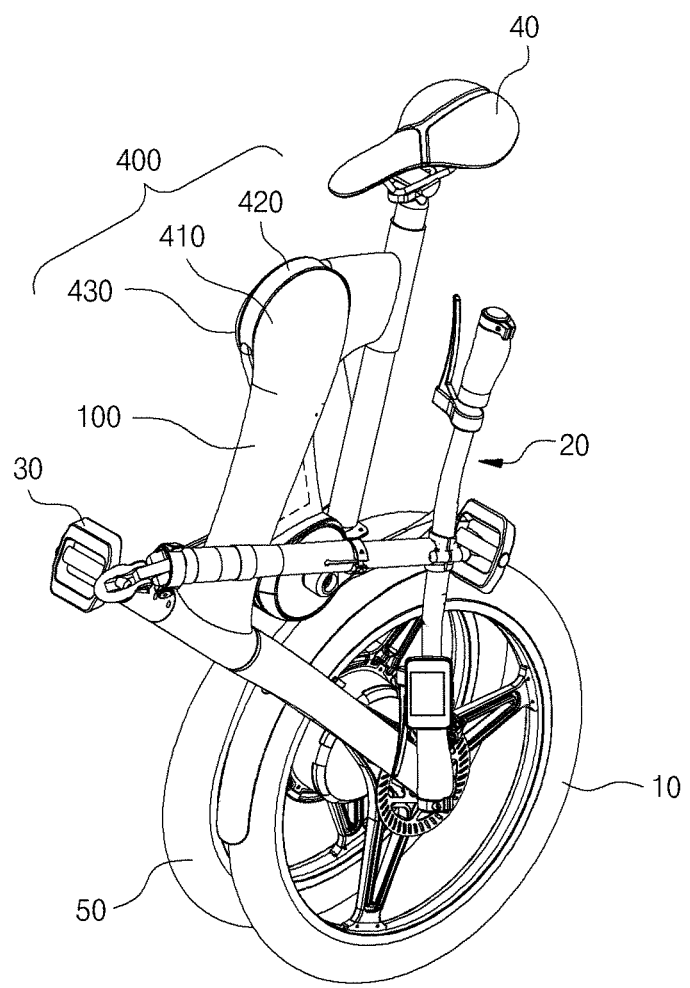
FIG. 4 is a perspective view of an electric bicycle in a state of being folded in accordance with an embodiment of the present disclosure.
Figure 5:
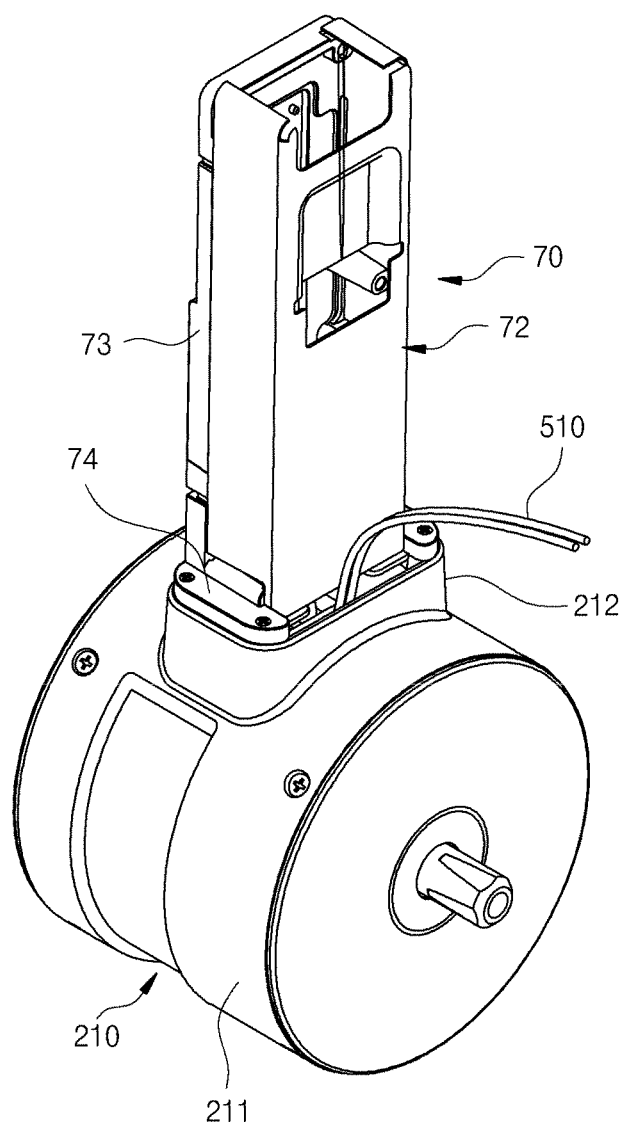
FIG. 5 is a perspective view illustrating a structure of a generator and an electronic control unit fixed to the generator with respect to an electric bicycle in accordance with an embodiment of the present disclosure.
Figure 6:
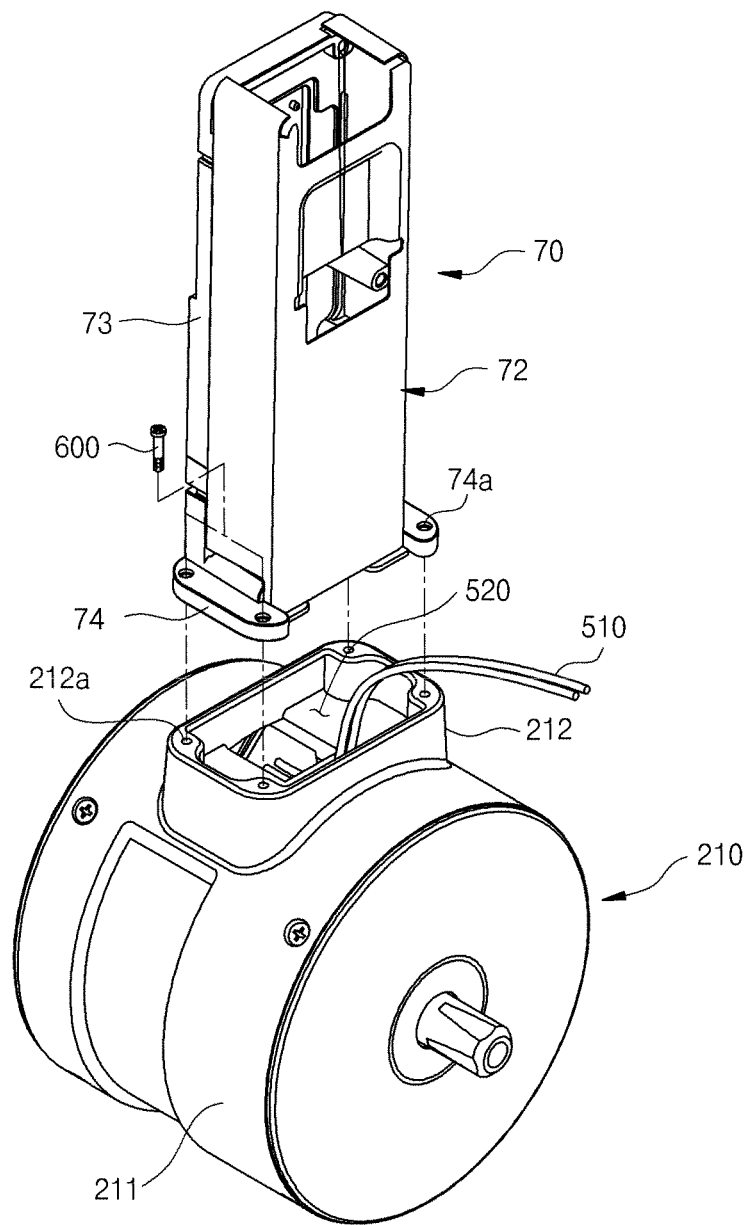
FIG. 6 is a perspective view illustrating a disassembled state of the electronic control unit from the generator in the state of FIG. 5.
Figure 7:
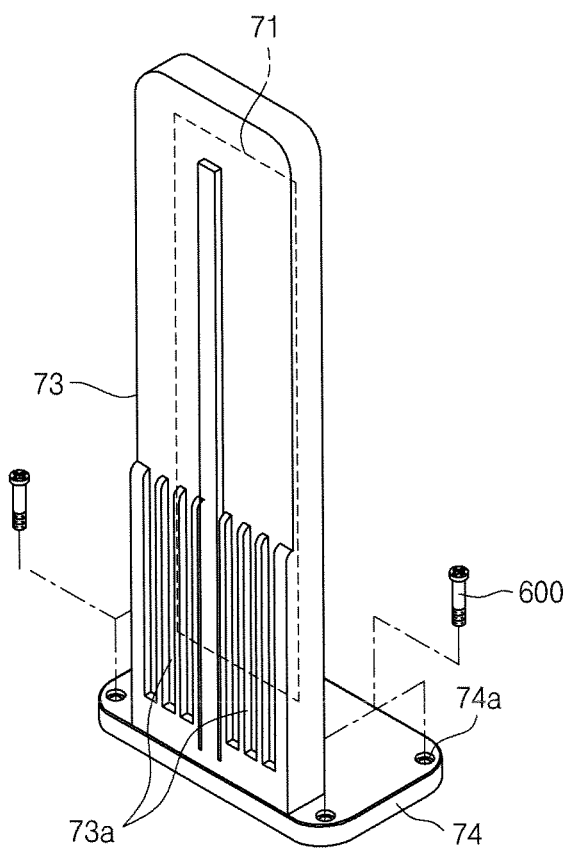
FIG. 7 is a perspective illustrating a structure of a side panel and a bottom panel of a housing integrally formed with each other at an electronic control unit of an electric bicycle in accordance with an embodiment of the present disclosure.
Figure 8:
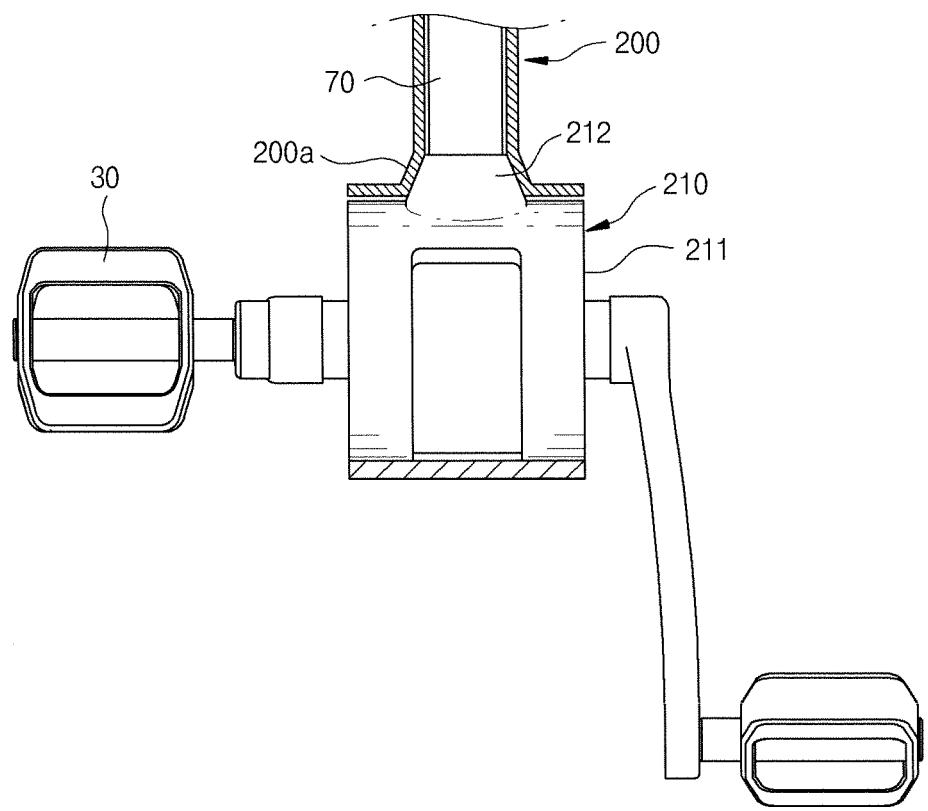
FIG. 8 is a cross-sectional view of a principal part at a lower portion side of a center frame of an electric bicycle in accordance with an embodiment of the present disclosure.

FIG. 1 is a perspective view of an electric bicycle in accordance with an embodiment of the present disclosure, FIG. 2 is a plane view of en electric bicycle in accordance with an embodiment of the present disclosure, FIG. 3 is a side view of an electric bicycle in accordance with an embodiment of the present disclosure, and FIG. 4 is a perspective view of an electric bicycle in a state of being folded in accordance with an embodiment of the present disclosure.

Referring to FIGS. 1 to 4, an electric bicycle in accordance with one embodiment of the present disclosure forms a frame through frames 100, 200, and 300, and the frames 100, 200, and 300 include a front frame 100 provided with a front wheel 10 and a handle unit 20, a rear frame 300 provided with a rear wheel 50, a center frame 300 positioned in between the front frame 100 and the rear frame 300 so that a pedal 30 and a saddle 40 may be provided thereon.

As to reduce the size of the electric bicycle in a case of transporting or storing the electric bicycle, each of the frames 100, 200, and 300 is rotatively coupled to each other while having a hinge coupling unit 400 as a center of rotation.

The front frame 100 is provided with an inside space, and is provided in a shape of a bar. At one end of the front frame 100, a handle tube 110 is provided while at the other end of the front frame 100, the center frame 100 is rotatively installed. The handle tube 110 is provided in a shape of a hollowness, and a handle stem 21 is rotatively coupled to the handle tube 110. The handle stem 21 is provided with a front wheel fixing frame 22 toward a lower side of the handle tube 110, and is provided with a handle fixing frame 23 toward an upper side of the handle tube 110. The front wheel fixing frame 22, in order for the front wheel 10 and the rear wheel 50 to be positioned on a same line (refer to 'A' on FIG. 2), is provided by bending the handle stem 21 toward a side surface from a center of the handle stem 21. The handle fixing frame 23 is configured to support the center of a handle 24 having a shape of a bar, and at each end of the both ends of the handle 24, each of grips 25 as well as each of brake levers 26 for a braking of the front wheel 20 and the rear wheel 50 are provided. At one side of the handle 24, a display apparatus 27, which is con-figured to display the information on the electric bicycle such as the change of speed and the battery, is installed in an attachable/detachable manner, and at the other side of the handle 24, a lever 28, which is configured for the ON/OFF of the motor and the change of speed, is installed.

The center frame 200 is provided with an inside space having a shape of a hollowness, and is provided in a shape of a bar. At both sides of an upper end of the center frame 200, a rear end of the front frame 100 and a front end of the rear frame 300 are rotatively coupled. Through such, the front frame 100 and the rear frame 300 may be folded so that the front frame 100 and the rear frame 300 may be positioned at both sides of the center frame 200, that is, in the left side direction and in the right side direction of the center frame 200.

At a lower end of the center frame 200, a generator 210 is installed, and at both sides of the generator 210, a pair of pedals 30 is connected. The generator 210 is configured to convert the rotational force into electric energy, and the electric energy is supplied to a battery 60, and is electrically stored. The generator 210 is provided in a way that a cover 211 surrounds a generator unit (not shown), which is at an inside of the generator 210 to perform a power-generating action, from an outside of the generator.

In addition, the center frame 200, as to have the saddle 40 installed thereon, may include a saddle frame 220. The saddle frame 220 is provided at a rear side thereof with a saddle tube 42 on which the saddle 40 may be installed, and a saddle bar 44 configured to adjust the height of the saddle 40 is coupled to the saddle tube 42.

The rear frame 300 is provided with an inside space thereof, and is provided in a shape of a bar, while one end of the rear frame 300 is provided with the rear wheel 50 rotatively installed thereto, and the other end of the rear frame 300 is provided with the center frame 300 rotatively installed thereto.

At an inside space of the rear frame 300, the battery 60 and a battery management system (not shown) are provided.

At the rear wheel 50, a motor 52 is installed. The motor 52, by rotating the rear wheel 50 while being supplied with power from the battery 60, is configured to supply driving force to the electric bicycle.

In addition, at the front wheel 10 and the rear wheel 50, discs 14 and 54 and friction pads are mounted as braking members configured to limit the rotational force when the brake levers 26 are in motion.

Thus, the electric bicycle composed as the above, as a user manipulates the level 28 to drive the motor 52 to rotate the rear wheel 50, is capable of running. At this time, as the pedals 30 are rotated by use of feet, the rotational force of the pedals 30 is converted into electric energy at the generator 210, and the converted electric energy is electrically stored at the battery 60 so that the continuous use of the battery 60 may become possible. Of course, the battery 60, even in a state of not being through the generator 210, may be able to charge through a charger.

Also, for the folding motions of the frames 100, 200, and 300, the hinge coupling unit 400 includes a front hinge coupling unit 410 provided at one end portion of the front frame 100, a rear hinge coupling unit 430 provided at one end portion of the rear frame 300, and a center hinge coupling unit 420 provided at one end portion of the center frame 200. The front hinge coupling unit 410 and the rear hinge coupling unit 430 are coupled to the left/right side surfaces of the center hinge coupling unit 420.

Each of the hinge coupling units 410, 420, and 430, with respect to the line 'A' formed by the front wheel 10 and the rear wheel 50, is provided with an angle of inclination θ of about 6° to have the front wheel 10 and the rear wheel 50 of the electric bicycle to be positioned on a same line when the electric bicycle is in a state of being unfolded, and to have the front wheel 10 and the rear wheel 50 of the electric bicycle to be positioned side by side in a parallel manner when the electric bicycle is in a state of being folded. In a state that the frames 100, 200, and 300 are folded, the front frame 100 and the rear frame 300 are positioned to the left side and to the right side of the center frame 420. As to block or permit the folding motion of the frames 100, 200, and 300 while in a state of the electric bicycle being unfolded, an operating lever may be installed at one side of the hinge coupling unit 400.

Thus, a user, to have the front frame 100 and the rear frame 300 to be positioned at both sides of the center frame 200 while having the hinge coupling unit 400 as a center, may be able to fold the frames 100, 200, and 300, so that the size of the electric bicycle may be reduced in a case of transporting or storing the electric bicycle.

Meanwhile, the overall motion of the electric bicycle having the motion of the motor 52 is controlled by an electronic control unit (ECU) 70, and the electronic control unit (ECU) 70 includes a circuit board 71 and a housing 72 in which the circuit board 71 is built in, and in the embodiment, the electronic control unit (ECU) 70 is installed in a way to be built in at the center frame 200.

In a case of the center frame 200, since the center frame 200 is positioned in between the front wheel 10 and the rear wheel 50 both having higher risk of a collision during a course of driving, the center frame 200 may provide a relatively favorable position for the protection of the electronic control unit (ECU) 70 when compared to the front frame 100 and the rear frame 300 in a case when a collision occurs during a course of running. In addition, when transporting or storing the electric bicycle, in a case the front frame 100 and the rear frame 300 are rotated to the both sides of the center frame 200, that is, in the left side direction and in the right side direction of the center frame 200, through the folding structure of the frames already described, the both sides of the center frame 200 are covered by the front frame 100 and by the rear frame 300, and thus the electronic control unit (ECU) 70 built in at the center frame 200, in a case of transporting or storing the electric bicycle, may be less exposed to a damage from an outside impact.

In addition, the electronic control unit (ECU) 70, while being directly fixed at an upper portion of the generator 210, is built in between the both ends of the center frame 200 having a shape of a hollowness, so that the electronic control unit (ECU) 70 may be able to be stably built in an inside of the center frame 200 in a state of being prevented from a movement without using a separate fixing structure.

In addition, with respect to the center frame 200, in which the electronic control unit (ECU) 70 is accommodated, since the approachability to the front frame 100 and to the rear frame 300 at a front and at a rear of the center frame 200 is superior, in a case when the electronic control unit (ECU) 70 is built in at the center frame 200, the efficiency in performing a wiring task to electrically connect in between the electronic apparatuses, such as the lever 28 and the display apparatus 27 installed at the front frame 100 as well as the battery 60 and the motor 52 positioned at the rear frame 300, and the electronic control unit (ECU) 70 may be enhanced.

The housing 72 of the electronic control unit (ECU) 70 is provided in a shape of a rectangular box, and the circuit board 71 is mounted at an inner surface of a side panel 73 of one side of the housing 72. A bottom panel 74 of the housing 72 is provided with an outer side thereof extended toward a side direction to have a larger area than an upper portion of the housing 72.

With respect to the fixing of the electronic control unit (ECU) 70, a cover 211 of the generator 210 is provided at a central portion of an upper portion thereof with a mounting unit 212 integrally provided while being protruded toward an upper side. At an inside the mounting unit 212, a withdrawal groove 520 is formed to provide a withdrawal space of a cable 510 that is connected to the generator 210. A coupling groove 74a is formed at a periphery of the bottom panel 74 and a coupling groove 212a is formed at an outer side of the mounting unit 212 for the coupling of a coupling member 600. Accordingly, the electronic control unit (ECU) 70, in a state that the bottom panel 74 is being supported at an upper portion of the mounting unit 212 to cover the withdrawal groove 520, by coupling the coupling member 600 to the coupling grooves 74a and 212a, is completely fixed to the upper portion of the generator 210.

As to discharge the heat generated from the circuit board 71 during the operation process of the electronic control unit (ECU) 70, the side panel 73 is composed in a way that a heat-discharging unit 73a is formed using a heat-discharging material such as aluminum on a surface of the side panel 73, and the bottom panel 74 coupled to the mounting unit 212 is integrally manufactured with the side panel 73 using the same material as the side panel 73. Thus, in a state of the bottom panel 74 of the housing 72 is connected to the mounting unit 212 to be fixed to the mounting unit 212, the heat generated through the circuit board 71 may be discharged to an outside through the side panel 73 and through the bottom panel 74, as well as through the mounting unit 212, and thus, under the fixing structure of the electronic control unit (ECU) 70, the heat-discharging performance of the electronic control unit (ECU) 70 is also enhanced.

In addition, the generator 210 is provided in a cylindrical shape in a way that the both side surfaces of the cover 211 to which the pedals 30 are connected faces the both sides of the electric bicycle, and in order to stably support the generator 210, a lower end of the center frame 200 is provided to surround an outer surface of the cover 211 of the generator 210 in a radial direction, and under the installation structure of the generator 210, the position of the generator 210 may be distorted at an inside the center frame 200 in a case of the rotational motion of the pedals 30.

As to resolve such, in the embodiment, an inside wall of the center frame 200 corresponding to a direct upper portion of the generator 210 is provided with an adhering unit 200a adhered to an outside wall of the mounting unit 212. In a state of the mounting unit 212, which is integrally formed with the generator 210, adhered to the inside wall of the center frame 200 through the adhering unit 200a, even when the generator 210 is not fixed to the center frame 200 using a separate fixing member, a hooking structure is formed in between the generator 210 and the center frame 200, and thus the generator 210, without being distorted, may be able to maintain the posture thereof at an inner side at a lower end of the center frame 200 in a stable manner.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An electric bicycle, comprising:
a motor configured to rotate a front wheel or a rear wheel;
a battery to supply power to the motor;
a generator installed at a frame in between the front wheel and the rear wheel and having a pedal connected at both sides thereof, the generator configured to convert a rotational force of the pedals into electric energy, and to supply the electric energy to the battery; and
an electronic control unit (ECU) arranged at the frame directly fixed to an upper portion of the generator.

2. The electric bicycle of claim 1, wherein
the frame further comprises a front frame provided with the front wheel; a rear frame provided with the rear wheel; and a center frame, wherein one end of the center frame is connected to in between the front frame and the rear frame and the other end of the center frame is provided at an inside thereof with the generator installed, and
wherein the electronic control unit (ECU) is arranged between both ends of the center frame.

3. The electric bicycle of claim 2, wherein
at the upper portion of the generator, a mounting unit to fix the electronic control unit (ECU) is provided, the mounting unit protruding upwardly from the upper portion of the generator, and
an inner wall of the center frame that corresponds to a position of the mounting unit adheres to an outer surface of the mounting unit to prevent the mounting unit from moving.

4. The electric bicycle of claim 2, wherein
at the upper portion of the generator, a mounting unit to fix the electronic control unit (ECU) is provided, the mounting unit protruding upwardly from the upper portion of the generator,
the electronic control unit (ECU) comprises a circuit board and a housing having the circuit board built in,
the circuit board is mounted at an inner surface of a side panel of one side of the housing,
the housing is fixed to the mounting unit through a bottom panel, and
the side panel and the bottom panel are provided with a same heat-discharging material.

5. The electric bicycle of claim 2, wherein
a rear end of the front frame and a front end of the rear frame each is rotatively coupled to both sides of an upper end of the center frame such that the front frame and the rear frame are folded toward the lateral sides of the center frame.

6. The electric bicycle of claim 1, wherein the motor and generator are separate.

7. An electric bicycle, comprising:
a motor to rotate a front wheel or a rear wheel;
a battery to supply power to the motor;
a generator comprising a generator unit connected to pedals, and configured to supply electric energy to the battery by converting a rotational force into the electric energy, and a cover to surround the generator unit, the generator provided in between the front wheel and the rear wheel; and
a mounting unit integrally formed with an upper portion of the cover so that the electronic control unit (ECU) is directly fixed to an upper portion of the generator.

* * * * *